(12) United States Patent
Zimmerman et al.

(10) Patent No.: US 7,748,779 B2
(45) Date of Patent: Jul. 6, 2010

(54) ENERGY-ABSORBING DEVICE FOR A VEHICLE SEAT

(75) Inventors: Mark R Zimmerman, Oxford, MI (US); Zhenkang Li, Rochester Hills, MI (US); Maryann Mertz, Royal Oak, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 254 days.

(21) Appl. No.: 11/866,487

(22) Filed: Oct. 3, 2007

(65) Prior Publication Data

US 2009/0091162 A1 Apr. 9, 2009

(51) Int. Cl.
*B60N 2/42* (2006.01)

(52) U.S. Cl. .............................. 297/216.13; 297/452.18

(58) Field of Classification Search ............... 297/216.1, 297/216.12, 216.13, 463.1, 452.18; 248/548
See application file for complete search history.

(56) References Cited

U.S. PATENT DOCUMENTS

| | | | | |
|---|---|---|---|---|
| 3,523,710 A | * | 8/1970 | Barecki et al. ......... | 297/216.13 |
| 3,528,703 A | * | 9/1970 | Seizho ...................... | 297/391 |
| 3,897,974 A | * | 8/1975 | Barecki .................... | 297/451.1 |
| 4,106,810 A | * | 8/1978 | Barecki .................... | 297/183.7 |
| 4,252,341 A | * | 2/1981 | Barecki et al. ............. | 280/751 |
| 4,991,907 A | * | 2/1991 | Tanaka ...................... | 297/408 |
| 5,362,129 A | * | 11/1994 | Itoh et al. ................... | 297/391 |
| 5,681,081 A | * | 10/1997 | Lindner et al. ......... | 297/216.13 |
| 5,683,141 A | * | 11/1997 | Wakamatsu et al. ......... | 297/408 |
| 5,765,918 A | * | 6/1998 | Wakamatsu et al. ......... | 297/408 |
| 6,880,891 B2 | * | 4/2005 | Yetukuri et al. ............. | 297/410 |

* cited by examiner

*Primary Examiner*—Joseph F Edell
(74) *Attorney, Agent, or Firm*—Quinn Law Group, PLLC

(57) ABSTRACT

A vehicle seat has an energy-absorbing device connected to a transverse support member of the seat frame. The device has a plurality of rib members configured to plastically deform in response to an impact between an object and the device, thereby absorbing energy from the object. The device has a shell portion with a pair of intersecting side walls having a generally U-shaped profile defining a recess, and the rib members are connected to each of the side walls within the recess. The shell portion is one piece, and the shell portion and rib members are formed of molded plastic. Each rib member is equally spaced within the recess.

15 Claims, 4 Drawing Sheets

ENERGY-ABSORBING DEVICE FOR A VEHICLE SEAT

TECHNICAL FIELD

The present invention relates generally to an energy-absorbing device for use with a vehicle seat, and in particular to an energy-absorbing device that is connectable to an upper frame portion of the vehicle seat and that is plastically deformable upon impact with an object to thereby absorb an amount of energy transferred from the object.

BACKGROUND OF THE INVENTION

Modern automotive vehicles may be constructed using energy-absorbing external body panels, which serve to reduce an amount of energy ultimately transferred or transmitted through the vehicle body panels to the vehicle interior by an impacting object. The reduction of energy may in turn soften a perceived impact force by reducing the resultant energy transferred to the vehicle interior. Other energy-absorbing vehicle exterior components operate in a similar manner, for example low-speed bumper assemblies designed to soften or cushion an impact between two vehicles below a certain threshold speed.

Additionally, various vehicle safety devices, such as seat belts or deployable air bags, similarly help minimize the perceived force of an impact by absorbing an amount of energy transferred during an impact. While such devices are known to be highly effective for their intended purposes, they may be less than optimal for certain vehicle designs, such as large vans, buses, or sport utility vehicles (SUVs) having multiple rows of rear seats. For example, while seat belts are commonly used in conjunction with driver and front passenger seats in such vehicles, frontal air bag devices or other frontal supplemental energy-absorption devices are not typically positioned facing rear vehicle seats.

SUMMARY OF THE INVENTION

Accordingly, a vehicle seat is provided having a seat frame for supporting an upper cushion of the vehicle seat, and having an energy-absorbing device connected to the vehicle seat. The energy-absorbing device has a plurality of rib members that plastically deform in response to an impact between an object and the energy-absorbing device to thereby absorb energy from the object during an impact between the object and the energy-absorbing device.

In another aspect of the invention, the energy-absorbing device has a pair of intersecting side walls defining a recess, and the rib members are connected to each of the side walls within the recess.

In another aspect of the invention, each rib member is equally spaced within the recess along a length of the energy-absorbing device.

In another aspect of the invention, the height of the energy-absorbing device is approximately 30 to 40 millimeters (mm).

In another aspect of the invention, the seat frame has a transverse support member to which the energy-absorbing device is directly connected.

In another aspect of the invention, a vehicle seat has a generally rectangular frame configured for supporting an upper cushion of the vehicle seat, and the generally rectangular frame has a transverse support member forming an uppermost side thereof. An energy-absorbing device is operatively connected to the vehicle seat, and has a pair of intersecting side walls at least partially defining a recess therebetween.

In another aspect of the invention, the pair of intersecting side walls form a generally U-shaped profile, and an end of each of the intersecting side walls is directly connected to the transverse support member.

In another aspect of the invention, each of the intersecting side walls is approximately 3 to 5 mm thick.

In another aspect of the invention, an energy-absorbing device is provided for use with a vehicle seat frame. The energy-absorbing device includes a one-piece shell having a top end and a bottom end, and a pair of side walls that intersect along the top end to at least partially define a recess. Each side wall is connectable to the vehicle seat frame along the bottom end of the one-piece shell. A plurality of rib members are connected to the side walls, each rib member being equally spaced within the recess along a length of the one-piece shell. The rib members are plastically deformable in response to a threshold force transferred to the rib members by an object impacting a surface of one of the side walls.

In another aspect of the invention, the one-piece shell and each of the rib members are constructed of molded plastic.

The above features and advantages and other features and advantages of the present invention are readily apparent from the following detailed description of the best modes for carrying out the invention when taken in connection with the accompanying drawings.

DESCRIPTION OF THE PREFERRED EMBODIMENTS

Figure 1:
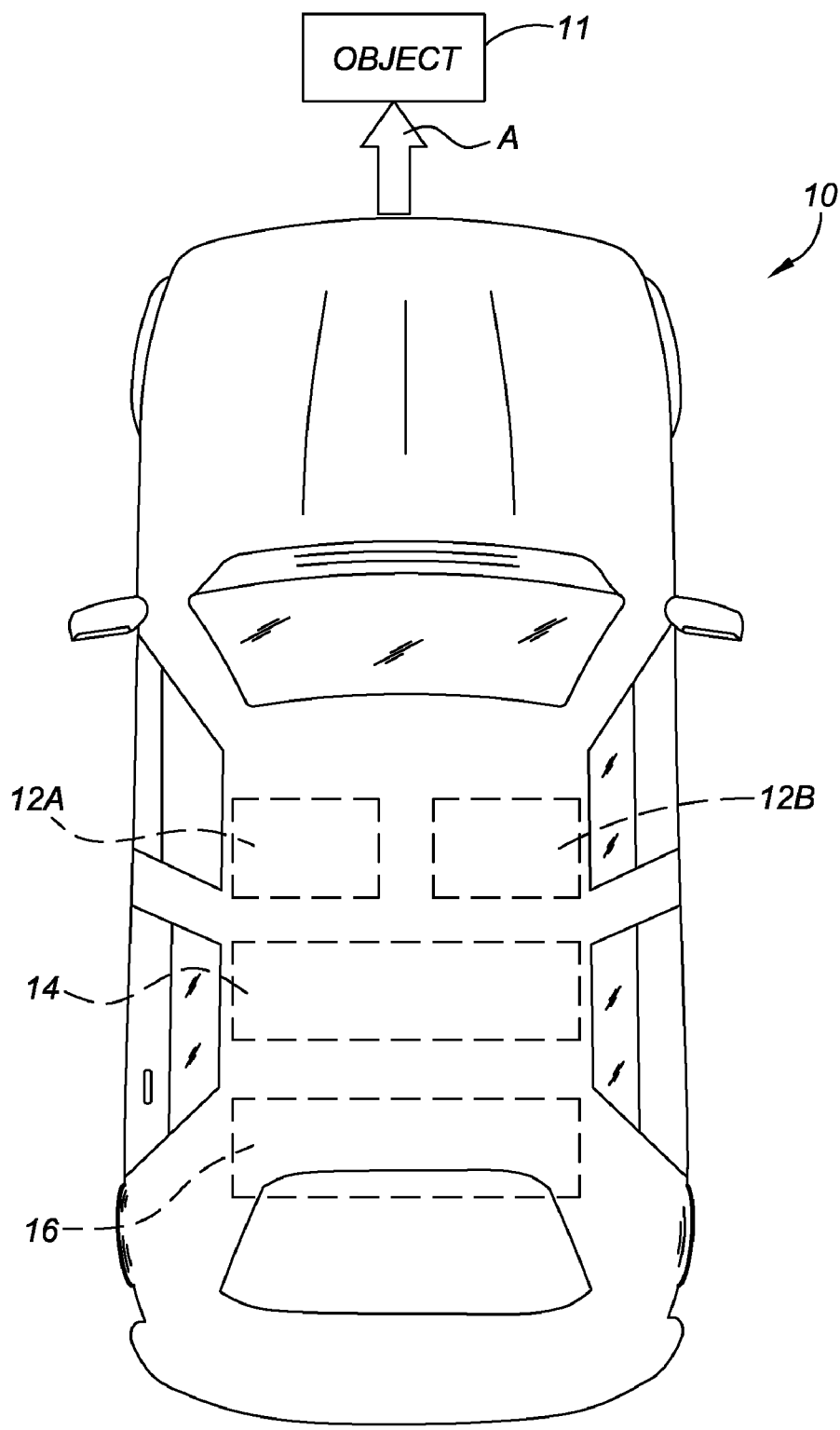
FIG. 1 is a schematic illustration of a vehicle having multiple rows of seats that may be adapted to use the energy-absorbing device of the invention.

Referring to the drawings, wherein like reference numbers correspond to like or similar components in the various figures, and beginning with FIG. 1, a vehicle 10 includes a driver seat 12A, a passenger seat 12B, and at least two additional rear seats 14 and 16, respectively. Vehicle 10 may include more than the two rear seats 14 and 16 shown in FIG. 1 as needed, for example when the vehicle 10 is configured for use as an extended or full-size passenger van, bus, or other such large passenger vehicle. Rear seats 14 and 16 may be bench-style seats configured for more than one occupant and extending laterally across the vehicle 10, as shown in FIG. 1. Alternately, the rear seats 14 and 16 may be individual or bucket-style seats configured for transporting just one occupant. Although within the scope of the invention rear seat 16 and any additional rear seats (not shown) may be configured in the same manner as rear seat 14, rear seat 14 will be referred to exclusively hereinafter for clarity in describing the invention.

Figure 2:
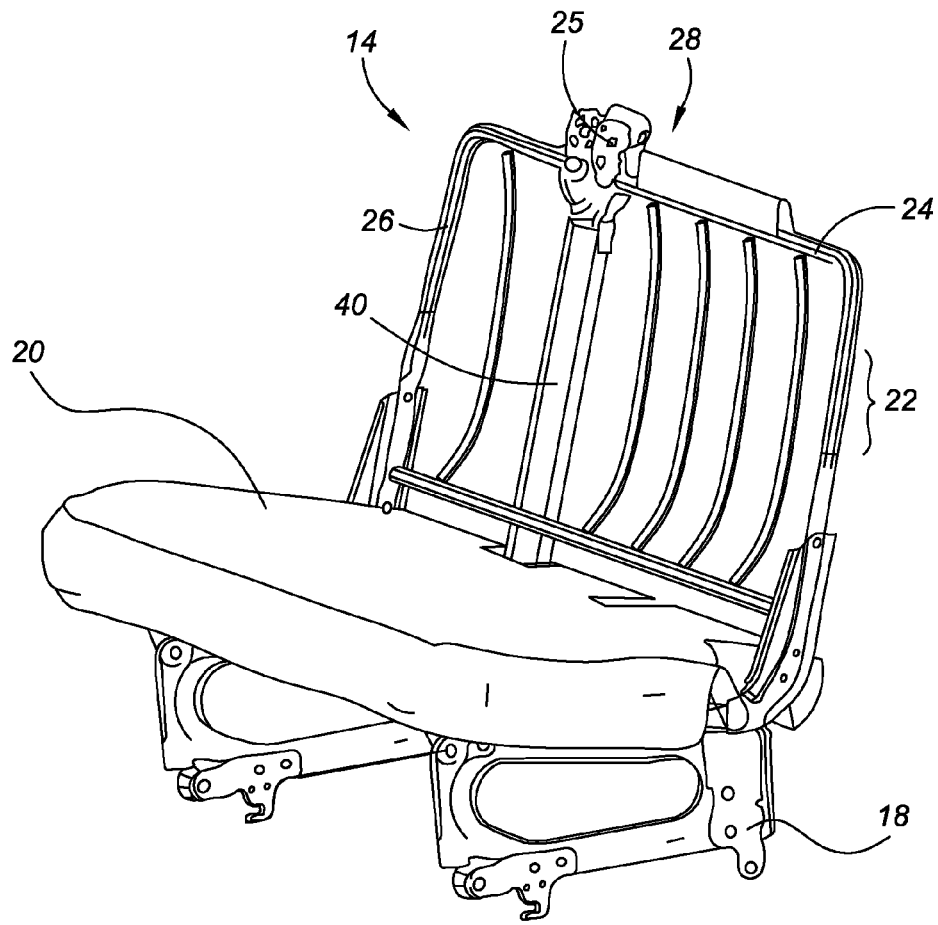
FIG. 2 is a perspective side view of a bench seat having an energy-absorbing device of the invention attached thereto.

Referring to FIG. 2, rear seat 14 includes a lower frame or base portion 18 that is operatively connected to a floor (not shown) of the vehicle 10 (see FIG. 1), as well as to an upper support structure or seat frame 22. Base portion 18 may be configured to adjust the position of rear seat 14 if so equipped, i.e. configured or equipped with any necessary seat positioning adjustment levers and/or switches (not shown). Additionally, base portion 18 is operatively connected to a lower seat cushion 20 that is positioned adjacent to a similarly configured back cushion or upper seat cushion 21 (see FIG. 6), with upper seat cushion 21 operatively connected to seat frame 22. The seat frame 22 is generally rectangular in shape, and may be constructed from tubular and/or stamped or welded steel or alloyed metal support beams or members. The frame 22 includes a pair of vertical support members 26 operatively connected to an upper horizontal or transverse support member 24 which forms an uppermost side of the generally rectangular frame 22.

In the event that the rear seat 14 is configured for use with a retractable seat belt apparatus (not shown) of the type known in the art, the rear seat 14 may include a retractor device bracket 25. Such a retractor device bracket 25 should be sufficiently constructed to provide a necessary level of support to such an apparatus, and may include a vertical load beam or bracket 40 as shown that is suitable for transferring or bearing any seat belt retraction load or shock resulting from a seat belt retraction event. Finally, an energy-absorbing device 28, hereinafter referred to for simplicity as E/A device 28, is operatively connected to the transverse support member 24 of rear seat 14 at or along an interface 19 (see FIG. 3). The interface 19 is defined as a region, length, or intermittent lengths of direct contact between the E/A device 28 and the transverse support member 24 to which the E/A device 28 is connected. Within the scope of the invention, the connection of the E/A device 28 to the transverse support member 24 may be achieved by various means, including push pins, clips, and/or an adhesive (not shown), with the selected connection means being sufficient for positioning the E/A device 28 with respect to the rear seat 14.

Figure 3:
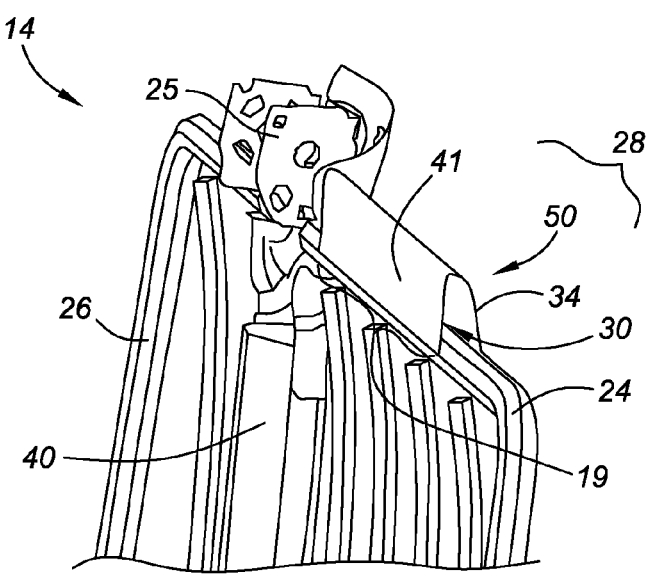
FIG. 3 is a perspective side view of a portion of the bench seat and of the energy-absorbing device of FIG. 2 shown in more detail.

Referring to FIG. 3, the E/A device 28 includes a solid, one-piece shell portion 50 that is shaped or formed to at least partially define a generally inverted U-shaped profile, with the shell portion 50 and the transverse support member 24 together defining a tunnel, opening, or recess 30. The generally inverted U-shaped profile is formed by the intersection of a first side wall 41 and a second side wall 34, each respectively having a face 41A, 34A (see FIG. 4). The respective side walls 41 and 34 may be simultaneously formed from a single piece of material, such as molded plastic, or from separately formed pieces that are ultrasonically welded or otherwise permanently interconnected after formation to thereby form a single or unitary E/A device 28. The transverse support member 24 is disposed at least partially within the recess 30, and the E/A device 28 is operatively connected directly to the transverse support member 24 along the interface 19 as described above.

Figure 4:
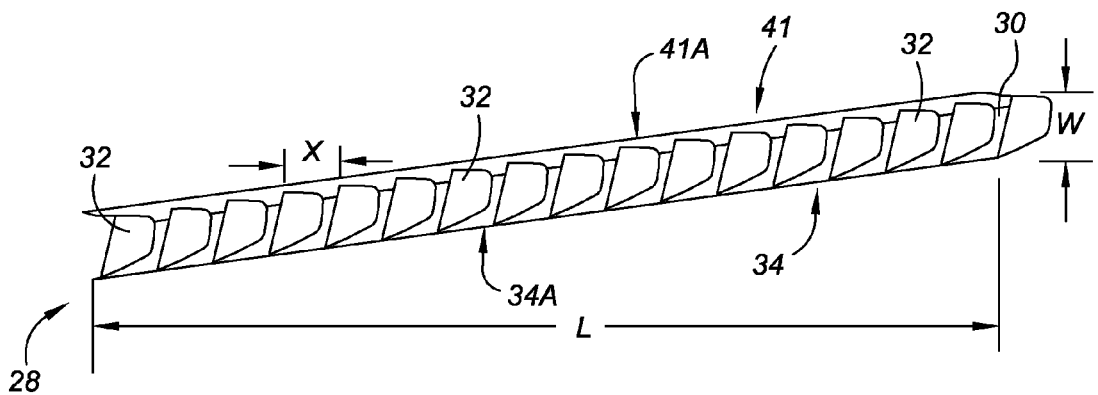
FIG. 4 is a perspective bottom view of the energy-absorbing device of FIGS. 2 and 3.

Referring to FIG. 4, the E/A device 28 is shown from a bottom perspective, i.e. looking upward into the recess 30. A plurality of equally interspaced internal walls or transverse rib members 32 are positioned within the recess 30 along the overall length L of the E/A member 28. Each rib member 32 is mutually separated or interspaced by a distance (X), with each rib member 32 being operatively connected to or integrally formed with each of the opposing side walls 41 and 34, respectively. The distance (X) in one embodiment is approximately 20 to 30 mm, however those of ordinary skill in the art will appreciate that other distances (X) may be used within the scope of the invention depending on the particular application.

Figure 5A:
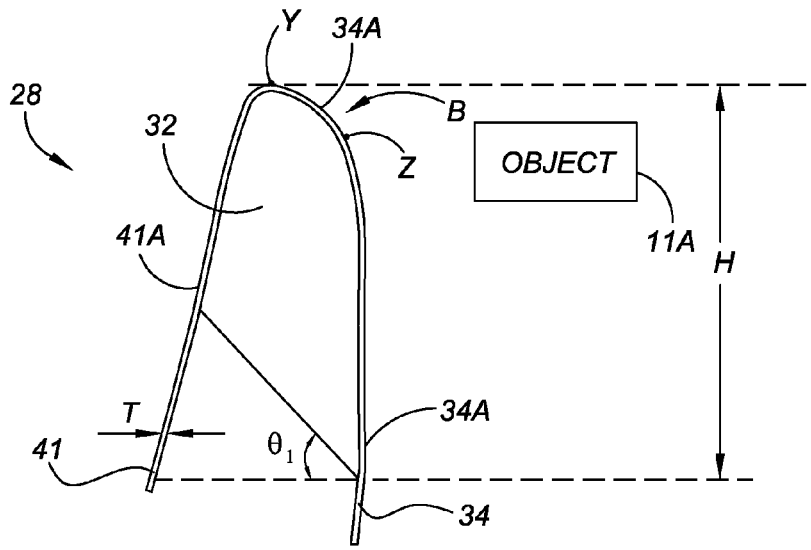
FIG. 5A is a perspective side view of the energy-absorbing device of FIGS. 2, 3, and 4 prior to an impact between the energy-absorbing device and an object.

Referring to FIG. 5A, each rib member 32 is positioned or oriented to form a "normal" or initial angle $\theta_1$ with respect to the first side wall 41, as will be described in more detail hereinbelow. The initial angle $\theta_1$ is substantially identical for each rib member 32, with the value of $\theta_1$ selected to provide a desired crush and/or yield strength to E/A device 28 for a predetermined force or load, as will be described later hereinbelow. Each of the rib members 32 are constructed of the same or similar materials as the respective side walls 41 and 34 described above, and are also selected to provide the desired crush and/or yield strength to the E/A device 28. In one embodiment, the side walls 41 and 34 each have a thickness (T) of approximately 3 to 5 mm, however those of ordinary skill in the art will appreciate that other thicknesses (T) may be used within the scope of the invention depending on the particular application.

The surface 34A of the E/A device 28 is oriented to generally face an object 11A within the vehicle 10 (see FIG. 1). Object 11A is moving in the direction of arrow B, i.e. in an arc-shaped path toward the surface 34A. In this pre-impact "snapshot" in time, each rib member 32 is slightly angled, positioned, or oriented to form the "normal" or initial angle $\theta_1$ with respect to the first side wall 41 as described above. The E/A device 28 has an apex represented by the point Y and a secondary point Z, which will be described below. The E/A device 28 has a height (H) above the transverse support member 24 (see FIGS. 2 and 3) that is sufficiently sized for ensuring that the E/A device 28 is properly positioned for intercepting the object 11A. In one embodiment, the height (H) is approximately 30 to 40 mm. However, those of ordinary skill in the art will recognize that other heights may also be usable within the scope of the invention, depending on the particular application, and/or size and energy of object 11A intended to be absorbed or damped by the E/A device 28.

Figure 5B:
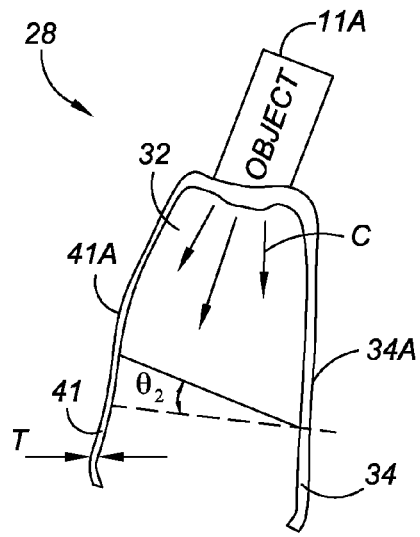
FIG. 5B is a perspective side view of the energy-absorbing device of FIGS. 2, 3, 4, and 5A immediately after an impact between the energy-absorbing device and an object.

Referring to FIG. 5B, a post-impact "snapshot" in time shows the object 11A immediately after having impacted the E/A device 28 at face 34A, with the impact ordinarily expected to occur somewhere between the points Y and Z of FIG. 5A, i.e. generally along the uppermost portion of the E/A device 28 as shown in profile of FIG. 5A. Immediately after such an impact event, the object 11A transfers an amount of energy to the E/A device 28. The shell portion 50 (see FIG. 3), and in particular the side walls 41 and 34, spreads or distributes the force of impact to the rib members 32, as represented by the distributed resultant forces (arrows C). Upon impact with an object 11A having a sufficient force and velocity, the rib members 32 are adapted via their spacing, selected size, shape, and/or their materials of construction to plastically deform in a predetermined manner and, in this manner, to absorb or dissipate a substantial portion of the amount of amount of energy transferred to the E/A device 28 by the object 11A. That is, through contact with the E/A device 28 as described hereinabove, the object 11A is provided with a reduced rate of deceleration.

The resultant plastic deformation of a rib member 32 is represented for illustrative purposes by the final angle $\theta_2$. The side walls 41, 34 may also plastically deform to some extent in response to the impact, as indicated by the changed profile shown in FIG. 5B. The final angle $\theta_2$ represents a changed relative position of each rib member 32, and is not meant to indicate a particular predetermined final angular value. The actual final angle $\theta_2$ is expected to vary, and will be determined largely by the particular dynamic properties of the object 11A, for example its velocity, acceleration, mass, shape, and an incident angle at which the object 11A impacts or strikes the E/A device 28. Additionally, as each rib member 32 is expected to fracture, bend, and/or shift position within the recess 30 in response to its proximity to the object 11A upon impact, each rib member 32 may have a unique final angle $\theta_2$ subsequent to such an impact. Finally, as each rib member 32 is not intended to elastically deform to any appreciable level or degree, substantially all of the energy imparted or transferred by the object 11A will be absorbed by the E/A device 28, thus reducing the amount of energy reacted or transferred back to the object 11A by the E/A device 28.

Figure 6:
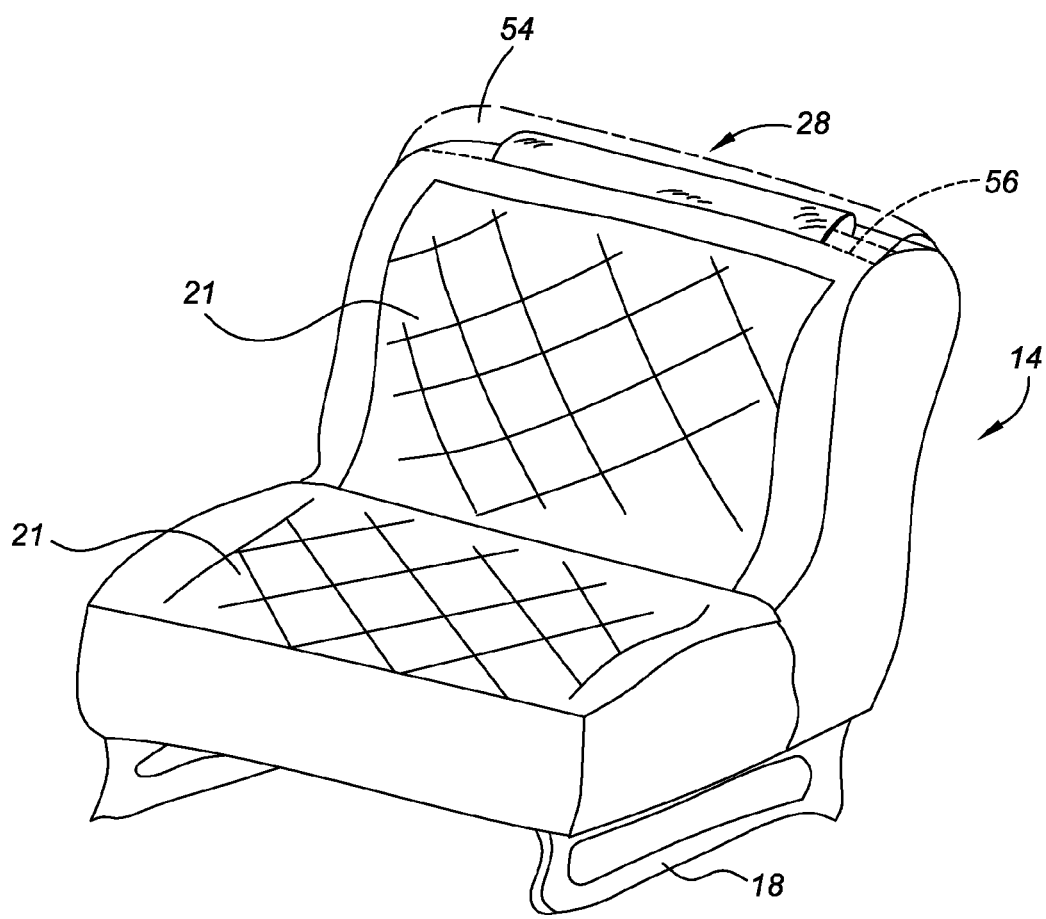
FIG. 6 is a schematic perspective front view of a rear seat configured with an energy-absorbing device of the invention.

Referring to FIG. 6, depending on the intended interior design of the vehicle 10, the E/A device 28 may be configured as a show piece, and therefore exposed in full view within an interior of vehicle 10 (see FIG. 1), or it may be a concealed portion of the rear seat 14. When fully exposed as a "show" surface, the E/A device 28 may protrude through one or more seams 56 and may be configured or provided with a predetermined surface finish, such as by using a particular shade of molded plastic or by applying a desired surface finish of a predetermined color and/or texture. When the E/A device 28 is concealed within the rear seat 14, as shown in phantom, the E/A device 28 may be hidden from view beneath one or more layers of outer upholstery and/or padding 54, rendering the appearance of any materials of construction of the E/A device 28 less relevant as a design factor.

While the best modes for carrying out the invention have been described in detail, those familiar with the art to which this invention relates will recognize various alternative designs and embodiments for practicing the invention within the scope of the appended claims.

The invention claimed is:

1. A vehicle seat comprising:
   a seat frame configured for supporting a back cushion of the vehicle seat, said seat frame including a transverse horizontal support member; and
   an energy-absorbing device directly connected to said transverse horizontal support member, wherein said energy-absorbing device includes an intersecting pair of opposed facing side walls at least partially defining a recess therebetween, and further having a plurality of rib members positioned within said recess and directly connected at opposite sides of said plurality of rib members to each of said intersecting pair of opposed facing side walls;
   wherein said plurality of rib members are adapted to plastically deform in response to an impact event occurring between an object and said energy-absorbing device to thereby absorb substantially all of an amount of energy from said object during said impact event, and said plurality of rib members substantially extend in the vertical direction.

2. The vehicle seat of claim 1, wherein each of said plurality of rib members are equally spaced within said recess along a length of said energy-absorbing device.

3. The vehicle seat of claim 1, wherein said energy-absorbing device has a height of approximately 30 to 40 millimeters.

4. The vehicle seat of claim 1, wherein said plurality of ribs are adapted to plastically deform by fracturing within said recess in response to said impact event.

5. A vehicle seat comprising:
   a generally rectangular frame configured for supporting a back cushion of the vehicle seat, said generally rectangular frame having a transverse horizontal support member forming an uppermost portion of said generally rectangular frame; and
   an energy-absorbing device directly connected to said transverse horizontal support member, said energy-absorbing device having an intersecting pair of opposed facing side walls at least partially defining a recess therebetween;
   wherein said plurality of rib members are equally spaced within said recess, directly connected at opposite ends to each of said opposed facing side walls, and configured for shifting a position with respect to said opposed facing side walls within said recess to thereby absorb substantially all of an amount of energy transferred to said energy-absorbing device by an impact event between an object and one of said intersecting pair of opposed facing side walls, and said plurality of rib members substantially extend in the vertical direction.

6. The vehicle seat of claim 5, wherein said intersecting pair of opposed facing side walls forms a generally U-shaped profile, and wherein an end of each of said side walls is directly connected to said transverse horizontal support member.

7. The vehicle seat of claim 5, wherein said energy-absorbing device is constructed of molded plastic.

8. The vehicle seat of claim 5, wherein each of said pair of intersecting side walls is approximately 3 to 5 mm thick.

9. The vehicle seat of claim 5, wherein said plurality of ribs are adapted to plastically deform by fracturing within said recess in response to said impact event.

10. An energy-absorbing device adapted for use with a vehicle seat frame having a transverse horizontal support member adapted for supporting a back cushion of a vehicle seat, the energy-absorbing device comprising:
    a shell portion having a top end and a bottom end, and a pair of opposed facing side walls that intersect along said top end to at least partially define a recess between said side walls, wherein each of said side walls is directly connectable to the transverse horizontal support member along said bottom end; and
    a plurality of rib members each directly connected at opposite ends to said pair of opposed facing side walls, each of said plurality of rib members being equally spaced entirely within said recess along a length of said shell portion;
    wherein said plurality of rib members are plastically deformable in a predetermined manner in response to a threshold force transferred to said plurality of rib members by an object impacting a surface of one of said pair of side walls, and wherein said plurality of rib members absorb substantially all of an amount of energy transferred to said energy-absorbing device by an impact event between said object and one of said pair of side walls by shifting a position with respect to said pair of side walls within said recess, and said plurality of rib members substantially extend in the vertical direction.

11. The energy-absorbing device of claim 10, wherein said shell portion and said plurality of rib members are constructed of molded plastic.

12. The energy-absorbing device of claim 10, wherein each of said pair of side walls is approximately 3 to 5 mm thick.

13. The energy-absorbing device of claim 10, wherein said shell portion is a unitary piece.

14. The energy-absorbing device of claim 10, wherein the energy-absorbing device has a height of approximately 30 to 40 mm.

15. The energy-absorbing device of claim 10, wherein said plurality of ribs are adapted to plastically deform by fracturing within said recess in response to said object impacting said surface.

* * * * *